United States Patent
Carelsen et al.

(10) Patent No.: US 9,256,940 B2
(45) Date of Patent: Feb. 9, 2016

(54) VASCULAR OUTLINING WITH OSTIA VISUALIZATION

(75) Inventors: Bart Carelsen, Eindhoven (NL); Maya Ella Barley, Walton On Thames (GB); Raoul Florent, Ville d'avray (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 21 days.

(21) Appl. No.: 14/343,132

(22) PCT Filed: Sep. 7, 2012

(86) PCT No.: PCT/IB2012/054633
§ 371 (c)(1),
(2), (4) Date: Mar. 6, 2014

(87) PCT Pub. No.: WO2013/038313
PCT Pub. Date: Mar. 21, 2013

(65) Prior Publication Data
US 2014/0219537 A1 Aug. 7, 2014

(30) Foreign Application Priority Data
Sep. 13, 2011 (EP) .................... 11306141

(51) Int. Cl.
*G06T 7/00* (2006.01)
(52) U.S. Cl.
CPC ............. *G06T 7/0012* (2013.01); *G06T 7/0042* (2013.01); *G06T 2207/10016* (2013.01); *G06T 2207/10081* (2013.01); *G06T 2207/10121* (2013.01); *G06T 2207/30101* (2013.01); *G06T 2207/30104* (2013.01)

(58) Field of Classification Search
CPC ... G06T 7/0012; G06T 7/0042; G06T 7/0079; G06T 2207/10116; G06T 2207/10121; G06T 2207/30101; G06K 2209/05; G06K 2209/051; A61B 6/504; A61B 6/52; A61B 6/5294; A61B 2576/00; A61B 2576/02
See application file for complete search history.

(56) References Cited

U.S. PATENT DOCUMENTS

| 6,047,090 A | 4/2000 | Makram-Ebeid |
| 2001/0012328 A1 | 8/2001 | Koppe et al. |
| 2009/0082990 A1 | 3/2009 | Deinzer et al. |

FOREIGN PATENT DOCUMENTS

WO  WO2010058398  5/2010

OTHER PUBLICATIONS

T. McInerney et al., "Deformable Organisms for Automatic Medical Image Anslysis", Medical Image Analysis 6 (2002), pp. 251-266.
Y. Sato et al., "A Viewpoint Determination of System for Stenosis Diagnosis and Quantification in Coronary Angiographic Image Acquisition", IEEE Transactions on Medical Imaging, vol. 17, No. 1, Feb. 1998, pp. 121-137.

*Primary Examiner* — Andrew W Johns

(57) ABSTRACT

An apparatus and a related method of processing a 2D projection image (110*a-b*) taken of a tubular structure comprising two or more tubes. One of the tubes branches off from the other at a sidewall opening. The apparatus is configured to estimate a position of the sidewall opening. The estimation is based on a segmentation of the one or more projection images. A marker for the estimated position of the sidewall opening can be displayed overlaid on the projection image.

12 Claims, 6 Drawing Sheets

VASCULAR OUTLINING WITH OSTIA VISUALIZATION

CROSS-REFERENCE TO PRIOR APPLICATIONS

This application is the U.S. National Phase application under 35 U.S.C. §371 of International Application Serial No. PCT/IB2012/054633, filed on Sep. 7, 2012, which claims the benefit of European Application Serial No. 11306141.0, filed on Sep. 13, 2011. These applications are hereby incorporated by reference herein.

FIELD OF THE INVENTION

The present invention relates to an apparatus for processing 2D images taken of a tubular structure, to a method for processing 2D projection images taken of a tubular structure, to a medical x-ray imaging system for processing 2D projection images taken of tubular structure, to a computer program element and to a computer readable medium.

BACKGROUND OF THE INVENTION

Interventional C-arm x-ray imaging equipment is sometimes used to support endo-vascular repair procedures like AAA (abdominal aortic aneurysm) or TAA (thoracic aortic aneurysm).

The interventional C-arm x-ray imager is used to produce a run of DSA (Digital Subtraction Angiography) projection images of the vasculature whilst a surgeon introduces therein a medical device such as a stent or an endo-graft. The images can be displayed on a screen during the intervention. The intervention is supported displaying on the screen a highlighted or marked outline of the vascular anatomy by means of a manual marker tool or by electronic means.

Precise positioning of the medical device inside the vessel is an objective.

The images obtained from the DSA run sometimes fail to give the surgeon a good idea of the position of the introduced medical device relative to an ostium in the vessel. This may then necessitate obtaining further DSA runs because positioning the medical device inside the vessel based on only the current DSA images can be challenging at times.

SUMMARY OF THE INVENTION

There may therefore be a need to provide medical practitioners with more information on the position of the ostia in an instant set of projection images.

The object of the present invention is solved by the subject matter of the independent claims wherein further embodiments are incorporated in the independent claims.

It should be noted that the following described aspects of the invention equally apply to the computer aided methods of processing 2D (two dimensional) projection images taken of a tubular structure, to the medical x-ray imaging system for processing 2D projection images taken of a tubular structure, to the computer program element and to the computer readable medium.

According to one aspect of the present invention there is provided an apparatus for processing 2D projection images taken of a tubular structure.

The tubular structure comprises a first tube and a second tube. The second tube branches off from the first tube at an opening in a sidewall of the first tube.

The image was taken whilst a contrast agent carrying fluid resided in the tubular structure.

The apparatus comprises:
an input unit;
a processing unit;
an output unit.

The input unit is configured to select an initial projection image.

The processing unit is configured to establish based on a segmentation of the initial projection image an estimate for the position in the projection image of the sidewall opening.

The output unit configured to display a marker for the estimated sidewall opening position thereby providing a visual representation for the position in the initial projection image of the sidewall opening.

The tubular structure may be part of a human or animal vasculature such as an aorta-artery bifurcation where the artery branches off from the aorta at an ostium or opening in the sidewall of the aorta. However, the ostium in the aorta-artery bifurcation is exemplary only and the invention may also be practiced on other parts of the vasculature or indeed any tubular structure.

The apparatus according to the present invention maximizes information extraction from projection images already taken. Repeated DSA runs otherwise necessary to establish the in-image ostium position can be obviated, thereby reducing x-ray dosage and contrast agent administration to the patient. It is no longer necessary to precisely position the projection angle orthogonal to the ostium position although the estimated ostium position may be used to re-adjust the projection angle as will be described below.

According to one embodiment of the present invention, the processing unit comprises:
a segmenter configured to segment an overlap region in the initial projection image; and
an intensity detector configured to detect inside or at a boundary of the overlap region an intensity drop, thereby establishing the position where the drop occurs as the estimate for the position of the first tube's sidewall opening.

The overlap region in the initial projection image is generally present if the projection axis used for acquisition of the image was not orthogonal to the plane defined by the aorta/artery bifurcation. The overlap region is formed by the respective projections ("footprints") of aorta and artery in the projection image because in the vasculature, aorta and artery overlap in perspective view when viewed along this non-orthogonal projection axis.

The apparatus is configured to harness the clues in the footprint of the overlap region to arrive at an estimate for the in-image position of the ostium. The boundary of the ostium is found where the drop in pixel grey value intensity occurs. The intensity drop occurs because there is an apparent accumulation of the contrast agent when the overlap in the vasculature is viewed in perspective view so the overlap region is generally darker within its boundary than outside.

According to one embodiment of the present invention, the projection image is one in a sequence of projection images taken one after the other whilst the fluid is flowing through the ostium. The segmenter is configured to establish a first and a second region in each of a selection of images from the image sequence. Selection means either all images in the sequence or less to save CPU time. Each of the first regions represents the first tube in projection view along the projection axis and each of the second regions represents the second tube in projection view along the projection axis. The apparatus further comprises a flow element identifier configured to identify across the selected projection images a first flow direction for the fluid flow represented in the first regions and a second flow direction for the fluid flow represented in the second regions.

The processing unit is configured to establish inside or at the boundary of the overlap region an intersection point by using the first and the second flow directions. The so established intersection point is a further estimate for the position of the first tube's sidewall opening. According to one embodiment of the present invention the processing unit is configured to establish an average estimate by averaging the estimate obtained from the initial projection image and the further estimate obtained from the sequence of projection images.

The cause of information extraction is further by combining the previous static or "still image" image analysis with a dynamic image analysis to so obtain a yet higher accuracy when estimating the ostium position.

Throughout the present application, the term "average" should be understood in its broad sense as a mathematical operation derived from a set of input scalar values to produce a value in between extreme values of the set. Examples of such mathematical operations are: arithmetical average, geometrical average, weighted average, robust statistics, median value, order statistics, interpolated value, and similar quantities.

According to one embodiment of the present invention the output unit is further configured to overlay the marker of the identified sidewall opening position on a master image of the tubular structure.

According to one embodiment of the present invention the master image is a fluoroscopy image of the vascular structure, wherein aorta and artery and/or the overlap region are each shown as outlined.

Graphically representing the ostium position in the relation to the vascular tree on screen helps the surgeon or medical practitioner navigate the vasculature and placing stent or endo-graft in patient's aorta. The risk of thereby occluding one of the arteries is reduced.

According to one aspect of the present invention, the estimated ostium position may be used as a clue to readjust the projection axis that was used in the x-ray apparatus when the projection images were acquired. The ostium position estimate combined with further parameters may be used to reduce the overlap region when taking follow-up images. The further parameters may indicate whether the artery branching off at the aorta is anterior or posterior with respect to the x-ray imager's x-ray source emitting the x-rays.

BRIEF DESCRIPTION OF THE DRAWINGS

Exemplary embodiments of the invention will now be described with reference to the following drawings wherein.

DETAILED DESCRIPTION OF EMBODIMENTS

Figure 1:
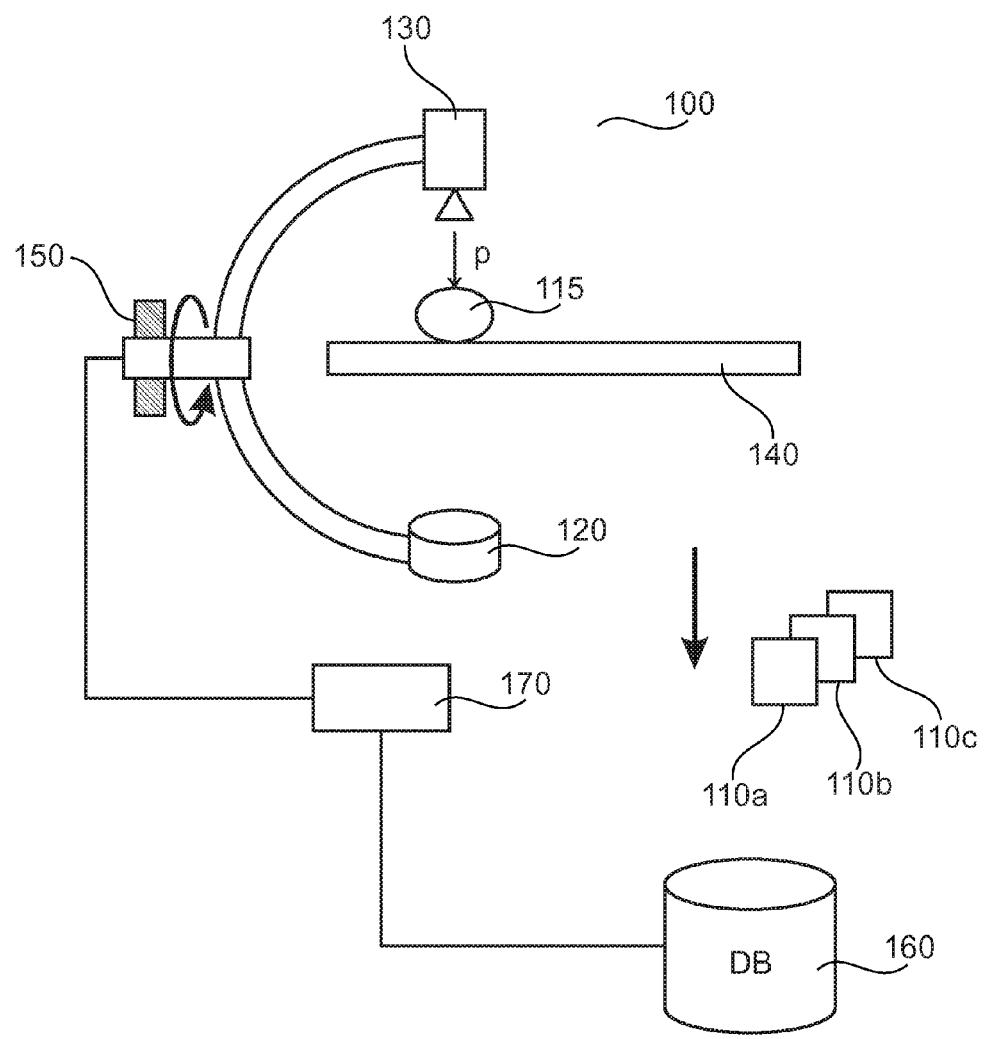
FIG. 1 show schematically a medical x-ray imaging apparatus for acquiring projection images.

Referring to FIG. 1, a C-arm x-ray imaging equipment 100 is shown.

A C shaped arm has attached on one of its ends an x-ray source 130 and on the other a detector 120 configured to detect x-rays emitted by x-ray source 130. C-arm has a shaft journaled on bearing 150 to allow rotation of C-arm carrying with it x-ray source 130 and detector 120. A table 140 is arranged central between the circle swept out by x-ray source 130 and detector 120 whilst C-arm is rotating. On table 140 an object of interest 115 is disposed for X-ray imaging. A controller 170 to control operation of x-ray imager is shown in communication with x-ray source 130, detector 120 and a data base 160.

As C-arm rotates around the object 115 to be imaged, x-ray source 130 emits x-rays impacting on object 115. X-rays pass from source 130 through the object 115 and onto detector 120. Each x-ray impinging on detector 120 generates a signal which is translated by controller 170 in pixel image information. X-ray is attenuated as it passes through object 115. The degree of attenuation is encoded in a grey value associated with that pixel.

As C-arm rotates around object 115, a plurality of images at a number of different projection angles or along different projection axis at different angles are acquired. In addition, for each projection axis p a number of frames are acquired at different acquisition times.

The output generated by interventional x-ray system 100, sometimes referred to as C-arm CT scanner, is a collection of different sequences of projections images, each image sequence representing the projection images acquired at a particular projection axis p at different acquisition times.

Output 2D projection images 110a-c are stored on data base 160 in a suitable digital format such as DICOM. Each of the images 110a-d is two dimensional because each is defined by an array of pixel image elements. Each pixel encodes a grey scale value. The grey values can be accessed or addressed by co-ordinates x, y defining the array. In each image 110a-d encodes in its DICOM header the projection angle alpha at which the image 110a, b, c or d has been acquired. Each image 110a-d defines a mapping (x, y)→g where each pixel element at position x, y in the image 110a-d has grey scale value g assigned to it. A grey value gradient can be defined for each pixel position x, y. The gradient is taken with respect to the mapping (x, y)→g and is a vector that points in the plane of the image along the direction of the greatest rate of change in grey values across the image. Database 160 does not necessarily refer to a set of files on a physical disk. It can also refer to a memory system on which images 110a-d are directly stored so that they may be processed by unit 170 or by another interfacing unit.

Figure 2:
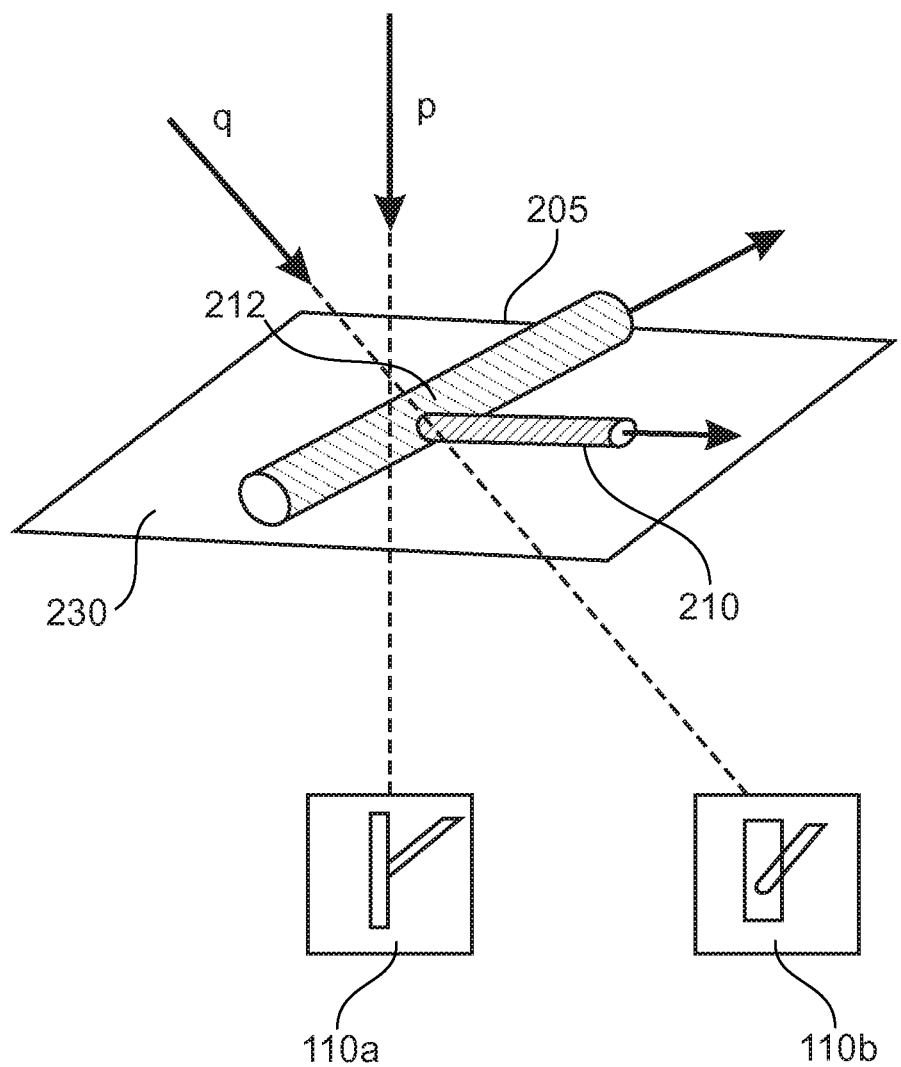
FIG. 2 schematically shows part of a vasculature of which projection images are taken.

With reference to FIG. 2, the object of interest 115 is a part of a human vasculature. The tubular structure shown is a schematic view of a part of a human aorta 205 having an artery 210 branching off therefrom. Aorta 205 and artery 210 define a bifurcation. Artery 210 interfaces aorta 205 at aorta 205's side wall. At the region of interface an "ostium" 212 or a side wall opening is formed to allow fluid passage from blood in the aorta into the artery or from the aorta into the artery. A contrast agent was residing in the blood whilst the images 110a-c were taken. The presence of the contrast agent is indicated in FIG. 2 by hachures inside of aorta 205 and artery 210. The longitudinal directions of aorta 205 and artery 210 define plane 230. Projection image 110a was acquired at a projection axis p orthogonal to plane 230 whereas projection image 110b was acquired at a projection axis q non-orthogonal to plane 230.

Figure 3:
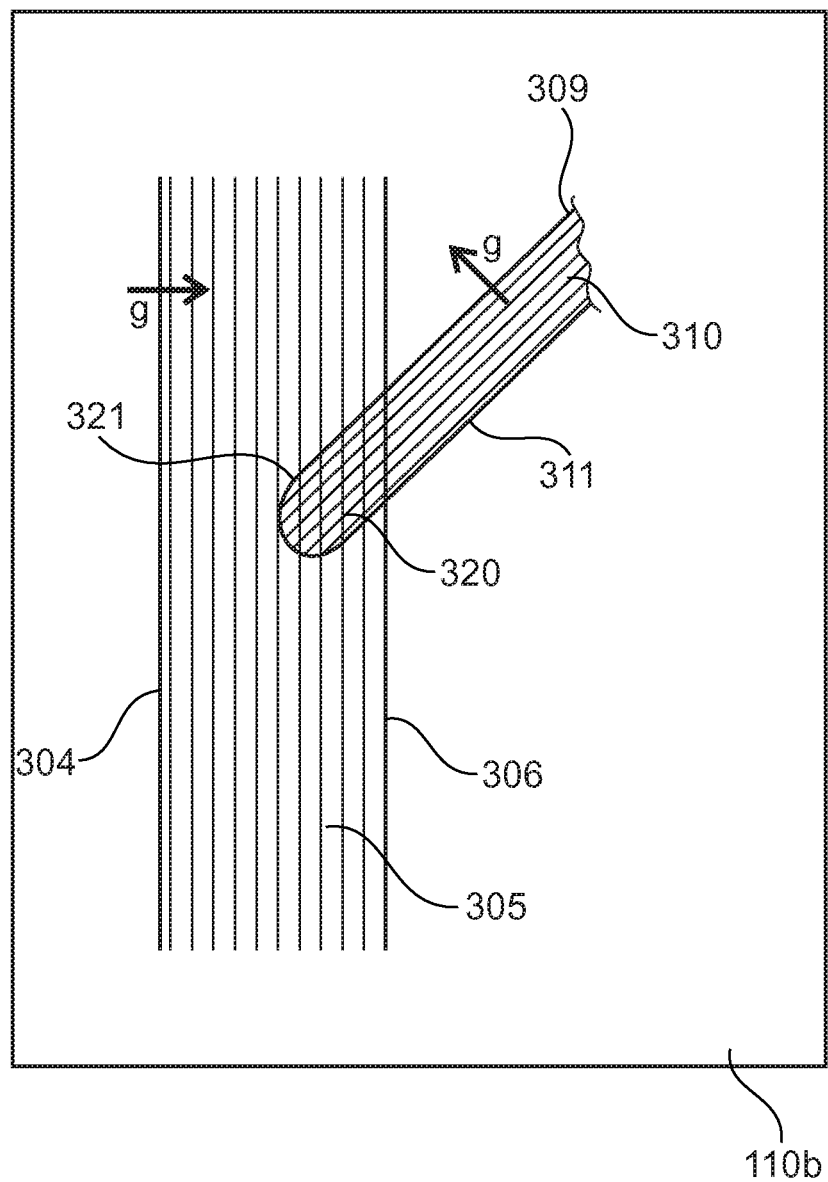
FIG. 3 shows a projection image of vasculature shown in FIG. 3.

Referring now to FIG. 3, a more detailed plan view of non-orthogonal projection image 110b is shown with the framing rectangle representing the edges of projection image 110b. Because of its generally tubular shape and because image 110b was acquired in approximation across patient's longitudinally axis, the projection of aorta 205 is shown as a generally rectangular portion in image 110b. The rectangular projection is referred to in the following as the aorta foot print 305. Similarly, the projection of artery 210 is shown as a rectangular portion 310 and referred to in the following as the artery footprint 310. It can be seen from FIGS. 2, 3 that artery 210 and aorta 205 are overlapping when viewed in projection view along projection axis q. The perspective overlap results in an overlap region 320 as shown in FIG. 3. Overlap portion 320 extends into aorta foot print 305 and terminates in a roughly semi-circular mouth portion which represents the region of the ostium 321.

Overlap portion 320 in projection image 110b results from x-ray passing at acquisition time of image 110b through both, the contrast agent residing in aorta 205 and the contrast agent residing in artery 210. The overlap region 320 in FIG. 3 appears therefore darker than either one of aorta footprint 305 or artery footprint 310 or the image background.

This apparent contrast agent accumulation caused by the perspective view is indicated in FIG. 3 by the cross hachures in overlap region 320.

Figure 4:
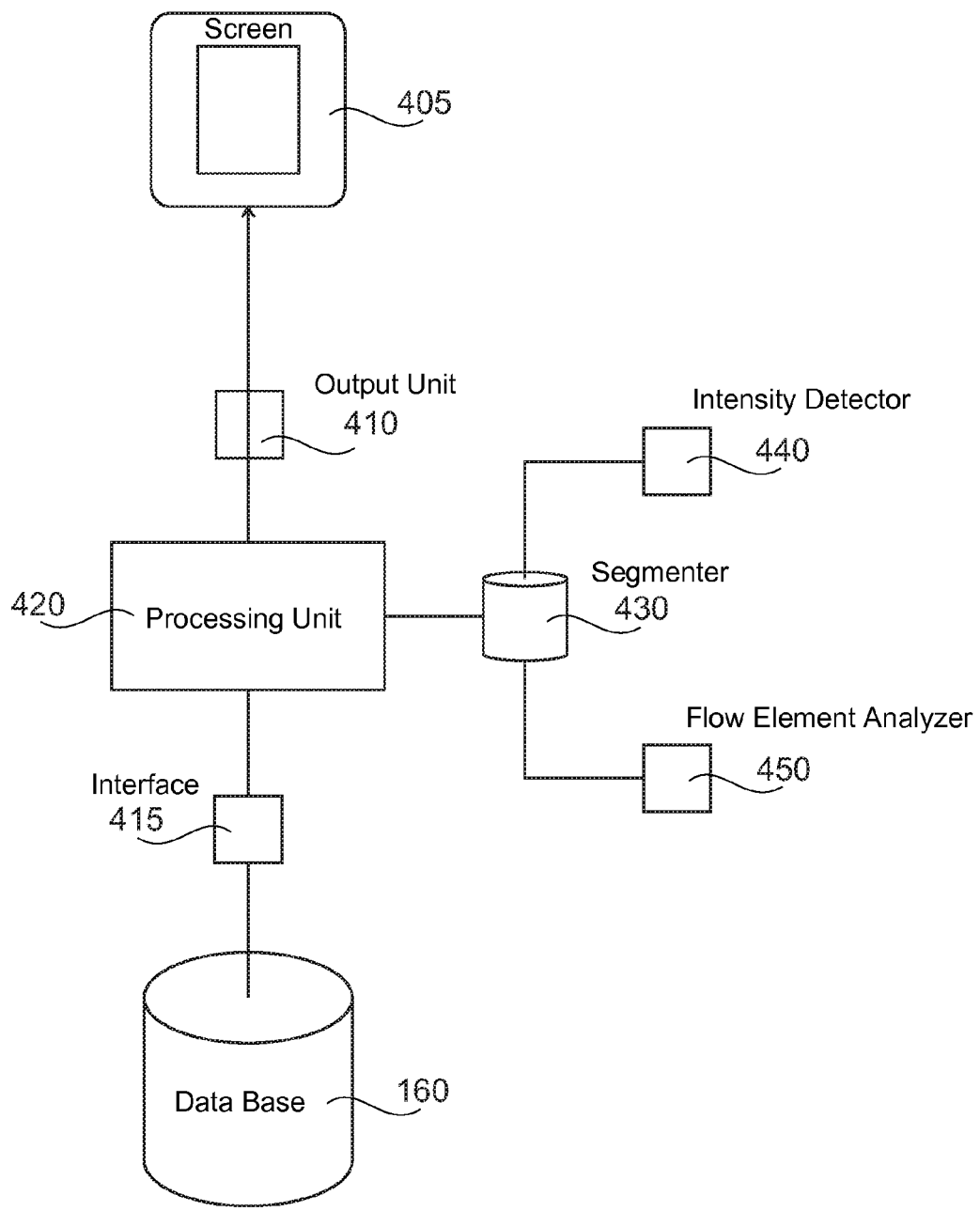
FIG. 4 shows an apparatus for processing a 2D projection image.

With reference to FIG. 4, an apparatus is shown which is configured to estimate the position of the ostium 321, the estimation being based on the image information in projection image 110b.

The apparatus comprises a processing unit 420 which, when in operation, is in communication with data base 160 via data base interface means 415. Processing unit 420 controls a segmenter 430 and a screen 405. The output on screen 405 is controlled by output unit 410. Segmenter 430 is in communication with intensity detector 440 and with flow element analyzer 450.

Broadly speaking, the apparatus in FIG. 4 outputs an estimate for the position of the ostium 321 in a vasculature projection image 110b. The estimated ostium position data helps as surgeon to plan C-arm supported intervention.

Upon start up, the processing unit connects via data base interface means 415 to date base 160 where the projection images 110a-c are held. The processing unit reads in projection image 110b. A copy of projection image 110b is then forwarded to the segmenter 430 to segment projection image 110b into one or more image segments. The so segmented projection image 110b is then passed to an intensity detector 440. Based on processing the segmented projection image 110b, intensity detector 440 outputs an estimate for the ostium position. Either before after or during forwarding segmented image 110b to intensity detector 440, the or another copy of segmented image 110b is forwarded to a flow element analyzer 450. Flow element analyzer 450 likewise processes segmented projection image 110b to output a further estimate for the ostium position.

Flow element analyzer 450 performs a temporal analysis across a sequence of images in which projection images 110b belongs. In distinction to flow element analyzer 450's temporal processing, intensity detector 440 processes image 110b "spatially" as a "still image". Both, the temporal sequence estimate and the still image estimate are then forwarded to processing unit 420 where the two estimates are averaged to produce an average final estimate for the ostium position. Output unit 410 then uses the estimated ostium position to generate graphical markers for the ostium positions which are then overlaid on projection image 110b and together displayed on screen 405 (see FIG. 5).

The components of the apparatus are shown spread out in FIG. 4. However, this is for clarity of illustration. The apparatus components processing unit 420, segmenter 430, intensity detector 440 and flow element analyzer may indeed be locally distributed and connected in a suitable communication network. In other embodiments however the components 420, 430 and 440 are running as software routines on the processing unit 420. The components may also be arranged as dedicated FPGAs or hardwired standalone chips. The components may be programmed in a suitable scientific computing platform such as Matlab® or Simulink® and then translated into C++ or C routines maintained in a library and linked when called on by processing unit 420.

Operation of the apparatus in FIG. 4 is now explained in more detail.

Segmenter unit 430 partitions hitherto unstructured pixel information in image 110b and defines pixel regions. The regions can then be treated as objects in their own right. Each pixel in image 110b can then be said to be either inside or outside the object. Each object into which image 110b has been partitioned into is likewise referred to as a segmentation.

Segmenter 430 reads in a copy of projection image 110b. Selection of the projection image 110b can be preceded by a contrast analysis to ensure that the selected image shows that there was enough contrast agent present when the image was acquired. Preferably projection image 110b is also selected to avoid saturation effects that would completely mask out overlap region 320.

Using gradient based edge detection techniques, the pixel grey values in image 110b is scanned to establish borders 304 and 306 of aorta footprint 305 as the most probable top to bottom contour lines. Exemplary gradient readings are indicted as g in FIG. 3. Segmenter 430 uses DICOM information in the header of image 110b in which the relation between image frame (portrait/landscape) and the basic longitudinal orientation of the imaged vasculature is encoded. In other embodiments, segmenter would analyze for most probable left to right or right to left contour lines.

Segmenter then segments artery foot print 310. From the right border 306 of aorta footprint 305, pixel paths are tracked based on gradients and/or centerness values. The paths are tracked towards the right edge of image 110b for a configurable path length. Grey value contrasts across the paths are measured using gradient values to so establish borders 309 and 311 of artery footprint 310.

The process can be repeated for other arteries branching off from the aorta foot print 305 but for the sake of simple illustration the procedure is explained for the single artery 310 footprint shown. From among the tracked paths neighboring paths are established having as compared to the image background relatively dark grey values in the region bordered between the neighboring paths. Pixels inside artery foot print 310 are expected to be darker because of the contrast agent in artery 205. Neighboring paths with relatively dark grey values regions in between are then taken to represent borders 309 and 311 of footprint 305 and the region between the border paths 309, 311 are registered as a segmentation of artery footprint 310. Above procedure for tracking aorta border paths would be similar for artery footprint branching off to the left border 304 of aorta footprint 305. There, paths are tracked in the opposite direction, from the left aorta foot print border 304 to the left edge of image 110b.

A pixel coordinate description of the points making up artery footprint 310 along with a pixel description of its paths is then forwarded to intensity detector 440. Segmenter 430 cooperates with intensity detector 440 to segment overlap region 320. Using a border 309, 311 path or center path of artery foot print 305, intensity detector 440 registers grey values along artery foot print center path towards aorta foot print 305. Upon entering aorta foot print 305 as rise in grey value darkness is detected because of the apparent contrast agent accumulation caused by the perspective view in projection image 110*b*.

Once inside aorta foot print 305, intensity detector 440 progresses along the direction of artery foot print center line until intensity detector 440 detects a sharp drop in grey value intensity. The pixel position where the drop occurs is registered and corresponds to a boundary 321 of the projection of ostium 212. Segmentation of overlap region 320 can now be completed using a model based approach. Width of artery foot print 305 can be assumed as the width of overlap region 320 as shown in FIG. 3. A rectangular portion can then be fitted around the artery foot print center path used when tracking the point on the ostium boundary. Using a circle as a model for the ostium footprint, said circle can be fitted inside the rectangular portion so that registered ostium boundary point is on the circle's perimeter. The center of said fitted circle is then output as an estimate for the position of the ostium 321. The procedure can be repeated not only for center lines but for both borders 311, 309 of artery footprint 310 and fitting circle accordingly. Different projection models other than circles and rectangles for ostium and artery may also be used. For instance, an ellipse may be used instead of a circle, and a curvilinear band may be used instead of a rectangular portion for the artery foot print 305.

According to one embodiment, the still image analysis by detector 440 is performed for each of a plurality of sample images.

The still image estimate or the plurality of still image estimates for the ostium position 321 is or are then returned to processing unit 420.

If the plurality of still image estimates is received an average is formed to obtain an average estimate for the still image analysis ostium position.

Flow element analyzer 450 reads in a sequence of projection images, including projection image 110*b* in the order in which they have been acquired by imaging apparatus 100. Because contrast agent carrying blood is moving across the vasculature as the images across the sequence have been acquired the flow can be established by using techniques from fluid dynamics such as streaklines or pathlines describing the velocity vector field of blood flow through the vasculature. For example a position of a particle across the sequence of images can be registered and velocity vectors tangent to its pathline can be determined as an indication for the flow direction. Flow vector are established for both, inside footprint 310 and inside aorta footprint 305. Lines along the vectors are made to intersect and the position of the intersection point is analyzed by flow element analyzer 450. If the intersection point occurs inside overlap region 320 the intersection point is output to processing unit 420 as a further estimate for ostium position 321. The flow based ostium position estimate may also be averaged by looking at different intersection points obtained in the same manner for pairs of different flow vectors in artery footprint 310 and aorta footprint 305.

According to one embodiment, flow element analyzer 450 produces an independent flow element based ostium position estimate for each of the images in the sequence separately. The so obtained sequence of ostium position estimates are then passed on to the processing unit for averaging. According to this embodiment, the temporal aspect of flow dynamics is only exploited in that each image provides a distinct view of the flow at the ostium. Less favorable contrast agent patters as shown in some of the images can so be averaged out making the estimation process more robust.

Processing unit then averages the ostium position as received from segmenter 430 and flow element analyzer 450.

Processing unit then passes the averaged positional data on to an output unit 415. Output unit such as a graphical user interface controller then generates graphical markers using the estimated ostium position. Markers in the form of colored circles outlining the ostium are then overlaid on projection image 110*b* or a fluoroscopy image on screen 405.

Figure 5:
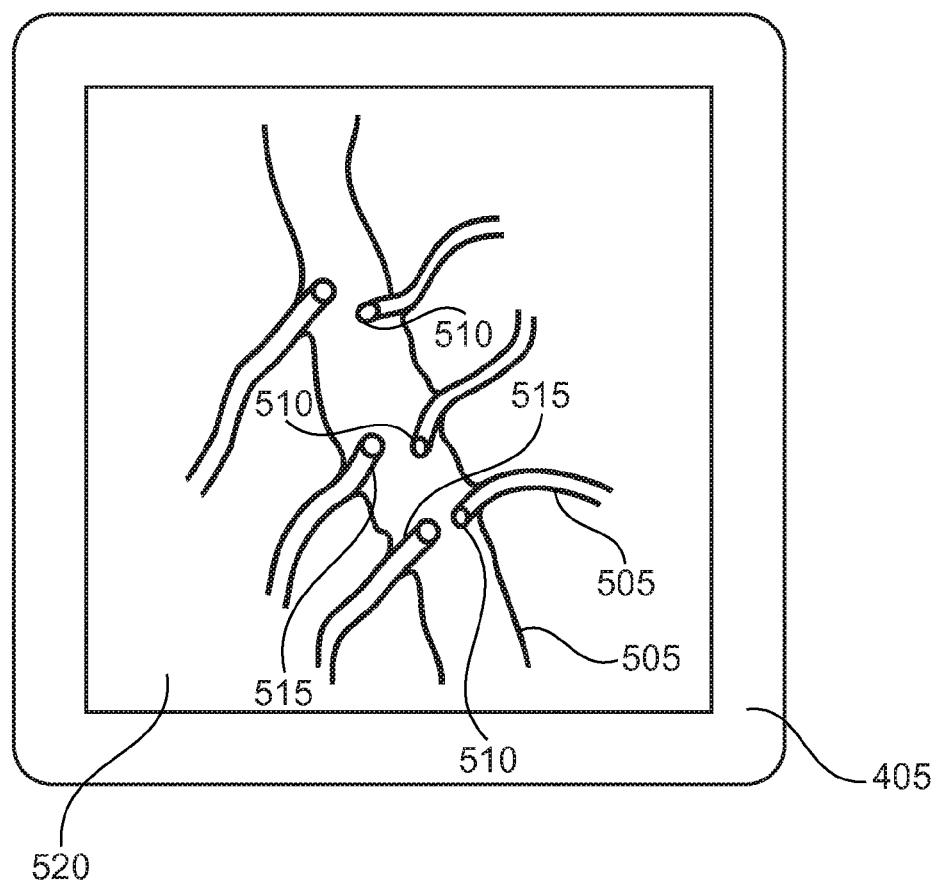
FIG. 5 shows an overview image generated by the apparatus in FIG. 4.

FIG. 5 shows a screen shot 405 of such an overview image with ostium position markers 510 overlaid. Image 520 may be a flow image or a representative DSA image obtained from images 110*a-c*. According to one embodiment there is also any overlay marker 515 outlining the overlap regions 515. Additionally or alternatively, markers 505 outline borders of the vasculature. The displayed vessel tree image can be used by a surgeon to control the positioning of a graft or a stent in the aorta. For instance, markers 505, 510, 515 may be overlaid on a fluoroscopy image used during endovascular device positioning and delivery. Occlusion of artery 205 can be avoided when positioning stent in aorta 205 because ostia positions are marked by ostium markers 510.

Figure 6:
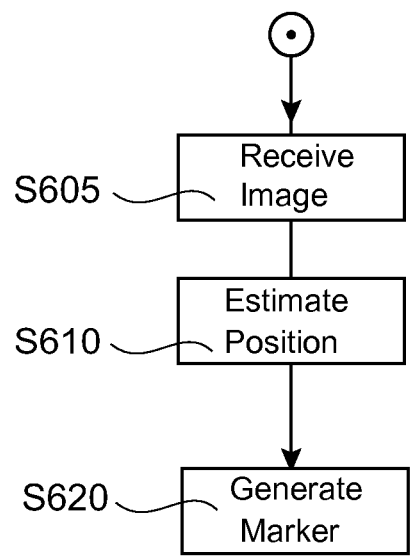
FIG. 6 shows a flowchart for a method of processing 2D projection images.

FIG. 6 shows a flow chart for a method of processing 2D projection images.

At step S605 the projection image is received.

In step S610 an estimate for the position in the projection image of the side wall opening is established based on a segmentation of initial projection image.

In Step S620 a marker is generated for display on the screen using the estimated side wall opening position. The marker when overlaid in the projection image provides a visual representation for the position in the initial projection image of the side wall opening.

According to one embodiment the step of establishing the ostium position includes segmenting an overlap region in the initial projection image. The overlap region in the initial images is formed because aorta and artery are overlapping when viewed along a projection axis which has been used to acquire the projection image. The step of establishing the ostium position further comprises detecting inside or at a boundary of the overlap region an intensity drop thereby establishing the position where the drop occurs as the estimate for the position of the ostium.

According to a further embodiment of the invention the step of establishing the ostium position further comprises establishing a first and a second region in each of the selection of images from a sequence of projection images. Each of the firsts regions represents the aorta in projection view along the projection axis and each of the second regions represents the artery in projection view along the projection axis.

The step of establishing the ostium position further comprises identifying across the selected projection images a first flow direction of a fluid represented in the first image regions and identifying a second flow direction for the fluid flow is represented in the second image regions. The step of establishing the ostium position step further comprises establishing inside or on the boundary of the overlap an intersection point by using first and second flow directions. The so established intersection point is then output as a further estimate for the ostium position.

According to a further embodiment of the invention, the ostium position estimates are averaged.

According to a further embodiment of the invention, markers for the estimated position are generated for overlay on a master image of the tubular structure.

According to one embodiment of the invention, the master image fluoroscopy image of the vasculature structure in first and second tubes are shown as outlined and when the tubular structure is either a human or animal vasculature.

According to a further embodiment of the invention, the estimated ostium position is used to adjust the projection angle in X-ray scanner 100 so that in subsequently obtained images the overlap region is reduced or even canceled. To this end further data provided by the radiologist operating X-ray imager 100 can be combined with the estimated ostium position. To minimize the foreshortening effect as represented by the overlap regions similar, the further data may include clues on whether the ostium is anterior or posterior with respect to the projection direction. In addition, in order to determine the new projection angle or angles, a model for of the shape of the artery cross-section at the ostium location may be used. The shape model is then fitted to the observed footprint 305. For instance, a circular cross-section might be assumed, and then fitted to the artery footprint 305 in the projection. The shape modeling of the artery footprint 305 allows back-projection of the 2D ostium position in 3D to a surface of the shape modeled cross-section. Additional data suitable to resolve the anterior/posterior ambiguity of the ostium position with respect to the projection direction then enables to unambiguously assign a 3D position to the ostium. The 3D position of the ostium allows determining an adjusted projection angle or axis for x-ray system 100 so that overlap regions in follow-up images can be minimized.

According to a further embodiment of the invention the output optimum position may be acquired whilst the imaging process is still underway. Imager 100 outputs images 100a-c which are feed in to apparatus 400 and processed on the fly to output the estimated ostium position. Output ostium position is then feed back into X-ray image controller 170 to adjust current projection angle used in X-ray imager 100.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an update turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A C-arm x-ray imaging apparatus for processing a 2D projection image taken of a tubular structure comprising a first tube and a second tube, the second tube branching off from the first tube at an opening in a sidewall of the first tube, the image taken whilst a contrast agent carrying fluid is residing in the tubular structure, the imaging apparatus comprising:
  a processing unit configured to select an initial projection image taken along a projection axis, the first tube and the second tube, when viewed along the projection axis, overlapping to form an overlap region in the initial projection image;
  a segmenter configured to segment the overlap region in the initial projection image, the processing unit being further configured to establish, based on the segmentation of the initial projection image, an estimate for the position in the projection image of the sidewall opening;
  an output unit configured to display a marker for the estimated sidewall opening position thereby providing a visual representation for the position in the initial projection image of the sidewall opening; and
  an intensity detector configured to detect inside or at a boundary of the overlap region an intensity drop, thereby establishing the position where the drop occurs as the estimate for the position of the first tube's sidewall opening.

2. The apparatus of claim 1, wherein the projection image is one in a sequence of projection images taken one after the other whilst fluid is flowing through the first tube's sidewall opening, wherein the segmenter is further configured to establish a first and a second region in each of a selection of images from the image sequence, wherein each of the first regions represents the first tube in projection view along the projection axis and each of the second regions represents the second tube in projection view along the projection axis, the apparatus further comprising:

a flow element identifier configured to identify across the selected projection images a first flow direction for the fluid flow represented in the first regions and a second flow direction for the fluid flow represented in the second regions;

wherein the processing unit is further configured to establish inside or at the boundary of the overlap region an intersection point by using the first and the second flow directions, the established intersection point being a further estimate for the position of the first tube's sidewall opening.

3. The apparatus of claim 2, wherein the processing unit is further configured to establish an average estimate by averaging the estimate obtained from the initial projection image and the further estimate obtained from the sequence of projection images.

4. The apparatus according to claim 1, wherein the output unit is further configured to overlay the marker of the identified sidewall opening position on a master image of the tubular structure.

5. The apparatus according to claim 1, wherein the master image is a fluoroscopy image of the vascular structure, wherein the first and second tubes and/or the overlap region are each shown as outlined, and wherein the tubular structure is a part of a human or animal vasculature.

6. A computer aided method of processing a 2D projection image taken, by means of a C-arm X-ray imaging apparatus, of a tubular structure comprising a first tube and a second tube, the second tube branching off from the first tube at an opening in a sidewall of the first tube, the image taken whilst a contrast agent carrying fluid is residing in the tubular structure, the method comprising:

selecting an initial projection image taken along a projection axis, the first and second tube, when viewed along the projection axis, overlapping to so form an overlap region in the initial projection image;

segmenting the overlap region in the initial projection image;

establishing, based on the segmentation of the initial projection image, an estimate for a position in the projection image of the sidewall opening, detecting inside or at a boundary of the overlap region an intensity drop, thereby establishing the position where the drop occurs as the estimate for the position of the first tube's sidewall opening; and generating for display on a screen a marker for the estimated sidewall opening position thereby providing a visual representation for the position in the initial projection image of the sidewall opening.

7. The method of claim 6, wherein the projection image is one in a sequence of projection images taken one after the other whilst the fluid is flowing through the first tube's sidewall opening, the method further comprising:

establishing a first and a second region in each of a selection of images from the image sequence, wherein each of the first regions represents the first tube in projection view along the projection axis and each of the second regions represents the second tube in projection view along the projection axis;

identifying across the selected projection images a first flow direction for the fluid flow represented in the first regions and a second flow direction for the fluid flow represented in the second regions; and establishing inside or at the boundary of the overlap region an intersection point by using the first and the second flow directions, the so established intersection point being a further estimate for the position of the first tube's sidewall opening.

8. The method of claim 7, the method further comprising: averaging the estimate from the initial projection image and the further estimate from the sequence of projection images to so obtain an average estimate for the sidewall opening position.

9. The method of claim 6, the method further comprising: for display on a screen, overlaying the marker of the identified sidewall opening position or the averaged sidewall opening position on a master image of the vascular structure.

10. The method according to claim 6, based on the estimated position of the sidewall opening, adjusting a projection angle in an imaging equipment thereby effecting, when the imaging equipment is used to acquire a further projection image of the tubular structure, the acquired further projection image having a reduced overlap region as compared to the overlap region in the initial projection image.

11. A medical X-ray imaging system for processing a 2D projection image taken of a tubular structure comprising a first tube and a second tube, the second tube branching off from the first tube at an opening in a sidewall of the first tube, the image taken whilst a contrast agent carrying fluid is residing in the tubular structure, the system comprising:

a database holding the 2D projection images;

the apparatus according to claim 1 further comprising database interface configured to access the 2D projection images in the database; and a screen for displaying the output marker of the identified sidewall opening position.

12. A non-transitory computer readable medium a program, executable by a computer processor, for processing a 2D projection image taken, by means of a C-arm X-ray imaging apparatus, of a tubular structure comprising a first tube and a second tube, the second tube branching off from the first tube at an opening in a sidewall of the first tube, the image taken whilst a contrast agent carrying fluid is residing in the tubular structure, the computer readable medium comprising:

selecting code for selecting an initial projection image taken along a projection axis, the first and second tube, when viewed along the projection axis, overlapping to form an overlap region in the initial projection image;

segmenting code for segmenting the overlap region in the initial projection image;

estimating code for establishing, based on the segmentation of the initial projection image, an estimate for a position in the projection image of the sidewall opening;

detecting code for detecting inside or at a boundary of the overlap region an intensity drop, thereby establishing the position where the drop occurs as the estimate for the position of the first tube's sidewall opening; and generating coded for generating for display on a screen a marker for the estimated sidewall opening position thereby providing a visual representation for the position in the initial projection image of the sidewall opening.

* * * * *